United States Patent

Woodling

[11] 3,722,966
[45] Mar. 27, 1973

[54] FLUID SEAL MEANS SURROUNDING BEARING MEANS

[76] Inventor: George V. Woodling, 22077 West Lake Road, Rocky River, Ohio 44116

[22] Filed: July 19, 1971

[21] Appl. No.: 163,707

[52] U.S. Cl..............................308/187.1, 308/207
[51] Int. Cl..............................F16c 33/76
[58] Field of Search....308/187.1, 207 R; 277/37, 50, 277/94

[56] References Cited

UNITED STATES PATENTS

| 2,617,698 | 11/1952 | Gaines | 308/187.1 |
| 3,612,632 | 10/1971 | Woodling | 308/207 R |
| 3,455,617 | 7/1969 | Woodling | 308/207 R |

*Primary Examiner*—Charles J. Myhre
*Assistant Examiner*—Barry Grossman
*Attorney*—Woodlins, Krost, Granger and Rust

[57] ABSTRACT

Fluid seal means surrounds bearing means and includes a step-shoulder which defines with said bearing means an annular groove to receive an O-ring seal.

5 Claims, 5 Drawing Figures

Patented March 27, 1973 3,722,966

INVENTOR.
GEORGE V. WOODLING
BY
Woodling, Krost, Granger and Rust.
attys.

3,722,966

FLUID SEAL MEANS SURROUNDING BEARING MEANS

BACKGROUND OF THE INVENTION standard mountings for fluid motors plus the demands for heavy side loads determine to a large extend the size of the motor body and the diameter of the bearings. As a consequence, space becomes a limiting factor where both mechanical and hydraulic provisions must be accommodated for in the same structure. Usually, either one or both of the mechanical or hydraulic provisions must be compromised at the expense of the other.

In the present invention, applicant has been able to achieve the conservation of space by making the fluid seal surround the bearing member, whereby the bearing member serves in a double capacity.

In U.S. Pat. No. 3,612,632, applicant relied upon the coinable, axial fixation means to provide the fluid seal.

Accordingly, it is an object of the present invention to conserve space by making the fluid seal surround the bearing member.

Another object is to obviate the need for relying upon the axial fixation means to provide the fluid seal.

SUMMARY OF THE INVENTION

The invention constitutes fluid seal means surrounding bearing means and comprising, first and second body means respectively having first and second face wall means confronting each other, bearing means including an annular bearing member in said first body means, said first body means having stepshoulder wall means extending from said first face wall means and surrounding said annular bearing member, said stepshoulder wall means and said annular bearing member defining an annular groove confronting said second face wall means, and O-ring seal means in said groove to provide a fluid seal between said confronting face wall means.

BRIEF DESCRIPTION OF THE DRAWINGS

Other objects and a fuller understanding of this invention may be had by referring to the following description and claims, taken in conjunction with the accompanying drawings, in which:

DESCRIPTION OF THE PREFERRED EMBODIMENT

Figure 1:
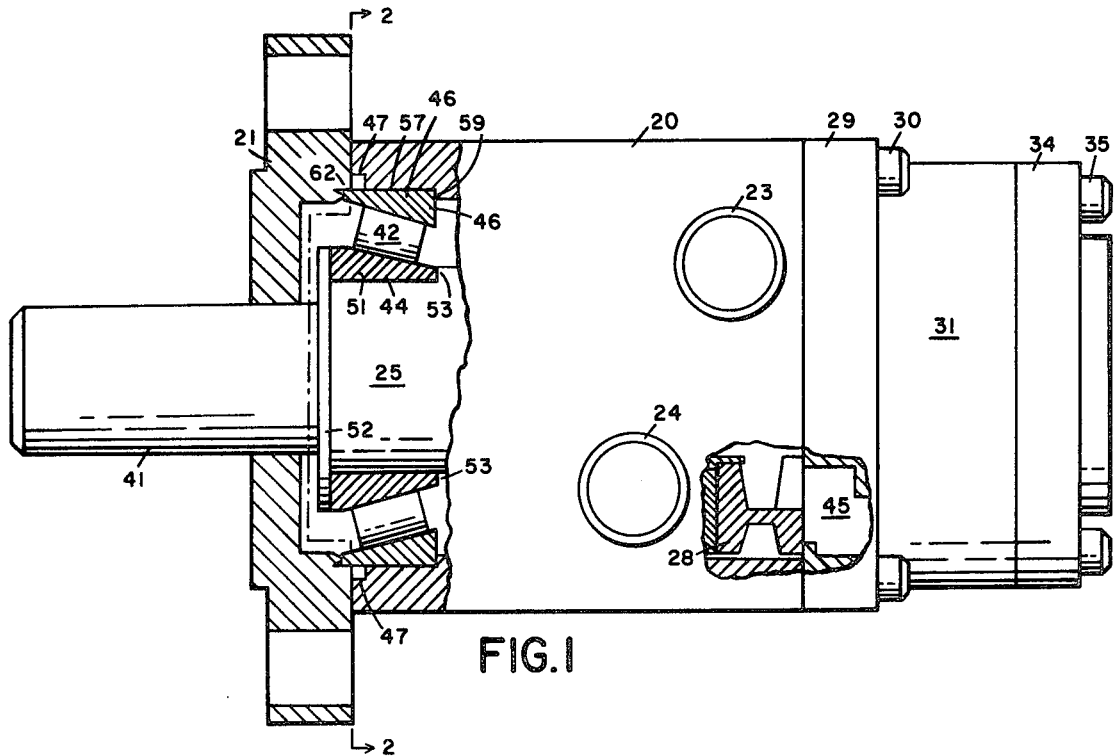
FIG. 1 is a top, partial sectional view of a fluid pressure device embodying my invention and showing an O-ring groove surrounding the outer cup of the bearing means.
Figure 2:
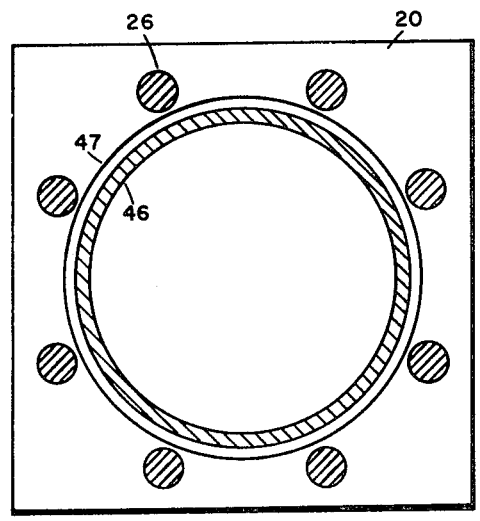
FIG. 2 is an end view of the housing in FIG. 1, taken along the line 2—2 thereof and shows principally the O-ring groove surrounding the outer cup of the bearing means, other sectional parts including the shaft are omitted for clarity.
Figure 3:
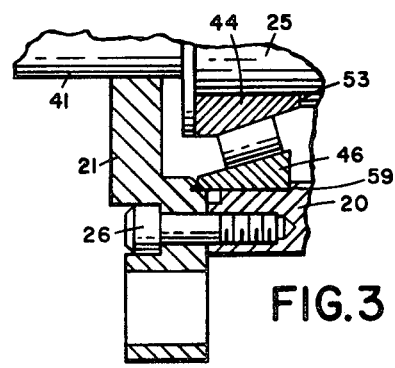
FIG. 3 is a fragmentary cross-sectional view corresponding to a sectional portion of FIG. 1, but taken through one of the cap screws.

For clarity of invention, the usual seal for the rotating shaft is not shown. Also, all wear parts are made of hardenable surfaces and are well lubricated by the operating fluid.

With reference to the drawing, the fluid pressure device in which my invention may be incorporated, comprises generally a main housing 20 having substantially a square cross-section. A mounting flange 21 may be secured to the left-hand end of the housing by means of suitable cap screws 26. Rotatively mounted in the left-hand end of the housing 20 is a main shaft 25 having an axis substantially coinciding with the longitudinal axis of the fluid pressure device. On the right-hand end of the housing, there is mounted a square stationary valve member 29 by means of suitable screws 30. A rotary valve 28 in the housing 20 is adapted to be rotated relative to the stationary valve member 29 for controlling the entrance of fluid to and the exit of fluid from a stator-rotor mechanism 31 through fluid passages 45 in the stationary valve 29. An end cap 34 encloses the stator-rotor mechanism 31. The stator-rotor mechanism 31 and the end cap 34 are secured to the stationary valve member 29 by means of screws 35. Fluid is delivered to and from the housing 20 through a pair of fluid ports 23 and 24.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 having an inner cone 44 and an outer cup 46. The enlarged internal portion of the main shaft 25 is provided with a portion 51 upon which the inner cone 44 is pressed. The right-hand end of the inner cone 44 abuts against a shaft shoulder 53. The left-hand end of the hollow housing 20 is provided with a body bore 57 into which the outer cup 46 is pressed. The right-hand end of the cup 46 abuts against a bore shoulder 59. The flange 21 is provided with a bore 62 confronting the body bore 57 in the housing 20.

Figure 4:
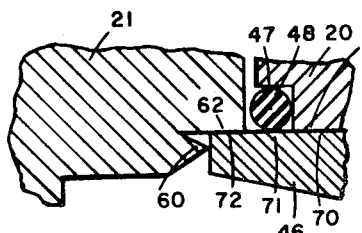
FIG. 4 is an enlarged fragmentary, cross-sectional view corresponding to a sectional portion of FIG. 1, the view showing an O-ring in the groove and before coinage of the fixation means.

The outer surface of the cup 46 is substantially cylindrical and has first, second and third annular surface portions 70, 71 and 72, see FIG. 4. The first annular surface portion 70 is pressed into the body bore 57 of the housing 20. The third surface portion 72 projects beyond the end of the housing 20 and is pressed into the bore 62 of the flange 21. the end face of the housing 20 is provided with a step-shoulder 47 and defines with the second annular surface portion 71 of the cup 46, an annular groove to receive an O-ring 48 which provides a fluid seal between the flange 21 and the end face of the housing 20. The first annular surface portion 70 makes a close fitting relationship (press-fit) with the body bore 57 and the third annular surface portion 72 makes a close fitting relationship (press-fit) with the flange bore 62 and function to hold the confronting bores in straight axial alignment. The left-hand annular portion 72 of the cup 46 extends into the flange bore 62 for only a relatively short distance, whereby the flange 21 may be readily dismantled from the housing 20 upon removing the screws 26.

Figure 5:
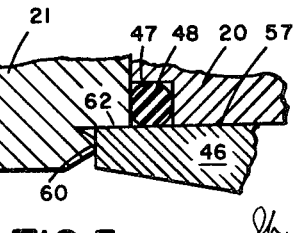
FIG. 5 is a view similar to FIG. 4, after coinage of the fixation means.

As shown, the outer cup 46 is secured against axial movement to the left by axial fixation means, indicated by the reference character 60. The axial fixation means 60 is located within the bore 62 of the flange and comprises an annular V-shaped or pointed rib which axially abuts against a transversely disposed solid abutment wall of the outer cup 46. The rib may be constructed either integrally with or as a separate part from the flange 21. By pressing the flange 21 against the end of the housing 20 during assembly, the pointed rib is coined against the outer cup 46, with the result that the fixation means accommodates for axial tolerance in matching the position of the cup 46 in the split-bores. The pressure required to coin the axial fixation means is greater than the end-wise thrust load to which the bearing means 42 may be subjected in operation, in which case the outer cup 46 is resisted against axial movement to the left. In assembly, the axial fixation means is axially fixable (coinable) and is disposed to resist an axial thrust load greater than the end-wise thrust to which the bearing means 42 may be subjected in operation. The FIG. 4 shows the axial fixation means 60 before it is coined or fixed and the FIG. 5 shows the axial fixation means after it has been coined. The reduced external shaft portion 41 where it passes axially through the end mounting flange 21 is not journalled therein but rotates therein with a small radial clearance which is adapted to be sealed off by suitable shaft seal means, not shown.

In the present invention, applicant obviates the need for relying upon the coinable, fixation means to provide the fluid seal by employing the O-ring seal surrounding the bearing cup 46. the cap screws 26, are arranged at annularly spaced intervals around the outside of the O-ring groove and hold the flange 21 securely to the housing 20. The radial space for both the cap screws and the O-ring groove is limited by standardization, but the present arrangement solves the problem of limited space by making the bearing cup 46 serve as one side of the O-ring groove.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Split-bore mounting for bearing means including fluid seal means, wherein said mounting comprising first body means having first transversely disposed face wall means, second body means having second transversely disposed face wall means disposed in facing relationship with respect to said first face wall means, said first and second face wall means defining interface wall means disposed to be sealed against fluid leakage, first bore means in said first body means, second bore means in said second body means, bearing means including an annular bearing member having substantially a cylindrical external surface, said external surface of said annular bearing member having first, second and third annular surface portions with said second surface portion being intermediate said first and third surface portions, said first surface portion being disposed in said first bore means and making a close fitting bore relationship therewith, said third surface portion being disposed in said second bore means and making a close bore fitting relationship therewith, connection means to hold said first and second body means together with said close fitting bore relationship holding said first and second bore means in substantially straight axial alignment with each other, said connection means comprising a plurality of connection elements respectively extending through one of said body means and engaging the other body means, said plurality of connection means being disposed at annularly spaced intervals around said annular bearing member, step-shoulder wall means defining with said second surface portion of said annular bearing member an annular groove, said fluid seal means in said groove to provide a fluid seal between said interface wall means, said step-shoulder wall means having an outside cylindrical wall disposed intermediate said second surface portion of said annular bearing member and said plurality of connection means, said second face wall means having an annular closure portion confrontingly enclosing and containing said fluid seal means in said groove, said fluid seal means circumferentially engaging said second surface portion of said annular bearing member and sealingly engaging said annular closure portion and said outside cylindrical wall and thereby sealing said interface wall means between said first and second body wall means against fluid leakage.

2. the structure of claim 1, wherein one of said body means includes said step-shoulder wall means.

3. The structure of claim 1, wherein said first body means includes said step-shoulder wall means.

4. The structure of claim 1, wherein said plurality of connection elements are circularly disposed around said annular bearing member and at substantially equally spaced distances in an outward direction therefrom, said outside cylindrical wall being disposed substantially concentrically intermediate said second surface portion of said annular bearing member and said plurality of circularly disposed connection means and being concentrically closer to said plurality of circularly disposed connection elements than to said second surface portion of said annular bearing member.

5. The structure of claim 1, wherein said second body means has axial fixation means against which said annular bearing member abuts.

* * * * *